United States Patent
Chang et al.

(10) Patent No.: US 8,447,663 B2
(45) Date of Patent: May 21, 2013

(54) SYSTEM AND METHOD FOR COORDINATION OF REMOTE INSPECTORS

(75) Inventors: Danny Chang, Los Altos, CA (US); Balaji Thallam Parthasarathy, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 284 days.

(21) Appl. No.: 12/787,327

(22) Filed: May 25, 2010

(65) Prior Publication Data

US 2011/0295718 A1    Dec. 1, 2011

(51) Int. Cl.
G06Q 30/00    (2012.01)

(52) U.S. Cl.
USPC ... 705/26.43; 705/26.1; 705/26.3; 705/26.41; 705/26.61; 705/27.1

(58) Field of Classification Search
USPC ............... 705/26.1, 27.1, 26.3, 26.41, 26.43, 705/26.61
See application file for complete search history.

(56) References Cited

U.S. PATENT DOCUMENTS

| | | | | |
|---|---|---|---|---|
| 7,146,331 B1 * | 12/2006 | Young | ........................ | 705/26.3 |
| 2002/0073049 A1 * | 6/2002 | Dutta | ........................ | 705/75 |
| 2005/0251400 A1 * | 11/2005 | Perelli | ........................ | 705/1 |
| 2007/0192229 A1 * | 8/2007 | Rowan | ........................ | 705/37 |
| 2010/0042508 A1 * | 2/2010 | Bundy et al. | ........................ | 705/26 |
| 2011/0099081 A1 * | 4/2011 | Pettersen et al. | ........................ | 705/26.3 |

OTHER PUBLICATIONS http://pages.motors.ebay.com/buy/inspection dated Jan. 25, 2009 and retrieved from www.archive.com on Jan. 11, 2013.*

* cited by examiner

*Primary Examiner* — Courtney Stopp

(74) *Attorney, Agent, or Firm* — Schwegman Lundberg & Woessner, P.A.

(57) ABSTRACT

A method and a system to automatically coordinate remote inspectors are provided. Initially, a listing is identified for remote inspection in an online publication system. The listing may describe an item for sale that is, in turn, associated with a geographical location and a category. One or more remote inspectors are identified based on the geographical location and the category associated with the item for sale. The listing and respective profiles of each of the one or more remote inspectors is published to a buyer. A selection of a selected remote inspector is received from the buyer. A template inspection report is provided to the selected remote inspector. Once the remote inspector has inspected the item for sale, the buyer is provided a completed inspection report received from the selected remote inspector.

20 Claims, 11 Drawing Sheets

| REQUEST | ITEM ID | STATUS | ACTION |
|---|---|---|---|
| HONDA CIVIC | 12345678 | PENDING INSPECTION | CONTACT SELLER |
| FORD FOCUS | 23456789 | PENDING REPORT | FILL OUT REPORT |
| TOYOTA CAMRY | 34567890 | AWAITING FEEDBACK | CONTACT BUYER |
| MAZDA 3 | 45678901 | CLOSED | NONE |

*REPORT*

*TOYOTA CAMRY*
*ITEM: 34567890*

BY:
BUMBLEBEE1

*OVERVIEW*

*MECHANICAL CONDITION*

*EXTERIOR*

*INTERIOR*

700

| TITLE | ITEM ID | STATUS | ACTION |
|---|---|---|---|
| HONDA CIVIC | 12345678 | AWAITING REPORT | CONTACT RI |
| FORD FOCUS | 23456789 | AWAITING FEEDBACK | LEAVE FEEDBACK |
| TOYOTA CAMRY | 34567890 | REPORT READY | VIEW REPORT |
| MAZDA 3 | 45678901 | CLOSED | NONE |

702

*REPORT*

*TOYOTA CAMRY*
*ITEM: 34567890*

BY:
BUMBLEBEE1

704

*OVERVIEW*

This is a great car.

*MECHANICAL CONDITION*

Runs well.

*EXTERIOR*

A few scratches.

*INTERIOR*

Very clean!

*Figure 7*

SYSTEM AND METHOD FOR COORDINATION OF REMOTE INSPECTORS

TECHNICAL FIELD

The present application relates generally to the technical field of electronic communication and, in one specific example, to coordination of remote inspectors.

BACKGROUND

In an online publication system, sellers post descriptions of items for sale or for auction. A potential buyer may view the description of the item for sale or for auction and decide whether to buy the item from the seller or to bid on the item. In some instances, the item may be one-of-a-kind or may be very expensive. For example, the item may be a new or used automobile, a piece of jewelry, an antique, or a piece of artwork. In these instances, the buyer may desire a third party opinion about the value of the item. Currently, a buyer may be given the option to view a third party report or appraisal or hire a professional expert (e.g., a gemologist, a mechanic, or an appraiser) to provide an independent appraisal of the item for sale.

BRIEF DESCRIPTION OF THE DRAWINGS

Some embodiments are illustrated by way of example and not limitation in the figures of the accompanying drawings in which:

FIG. 7 is an example of a user interface to display to a potential buyer.

DETAILED DESCRIPTION

Example methods and systems to coordinate remote inspectors within an online community are described. In the following description, for purposes of explanation, numerous specific details are set forth in order to provide a thorough understanding of example embodiments. It will be evident, however, to one skilled in the art that the present invention may be practiced without these specific details.

In an online publication system, a seller lists an item for sale. The item may be for sale by auction. In either instance, a buyer typically has a predetermined period of time to buy or bid on the item. During this period of time, the buyer may desire to inspect the item or view the item in person, particularly if the item is one-of-a-kind Examples of one-of-a-kind items include used automobiles, used heavy machinery, guns, jewelry, collectibles, antiques, artwork and handicrafts, and real estate.

The collective buyers and sellers who utilize the online publication system may form a community based on past transactions with one another. The online publication system may facilitate the formation of the community by providing ratings, reviews, and reputation scoring of the buyers and sellers. Other community features may include chat rooms, billboards, blogs, forums, and buyer/seller profiles. The online publication system may include and/or share data with one or more social media channels such as Facebook and Twitter.

While professional inspectors may offer their services via the online publication system, buyers hesitate to use these services due to cost or due to a lack of knowledge about the quality of these services. Instead, buyers may desire to contact other buyers and sellers within the community to perform an inspection of an item for sale on the buyer's behalf. The systems and methods described herein coordinate the remote inspections, provide a standardized inspection procedure, and manage feedback and ratings of the remote inspectors. It is noted that while the term "remote" is used to label the inspections coordinated by the described system, the buyers, sellers, and inspectors, may, in fact, be local to one another in a geographic sense.

Figure 1:
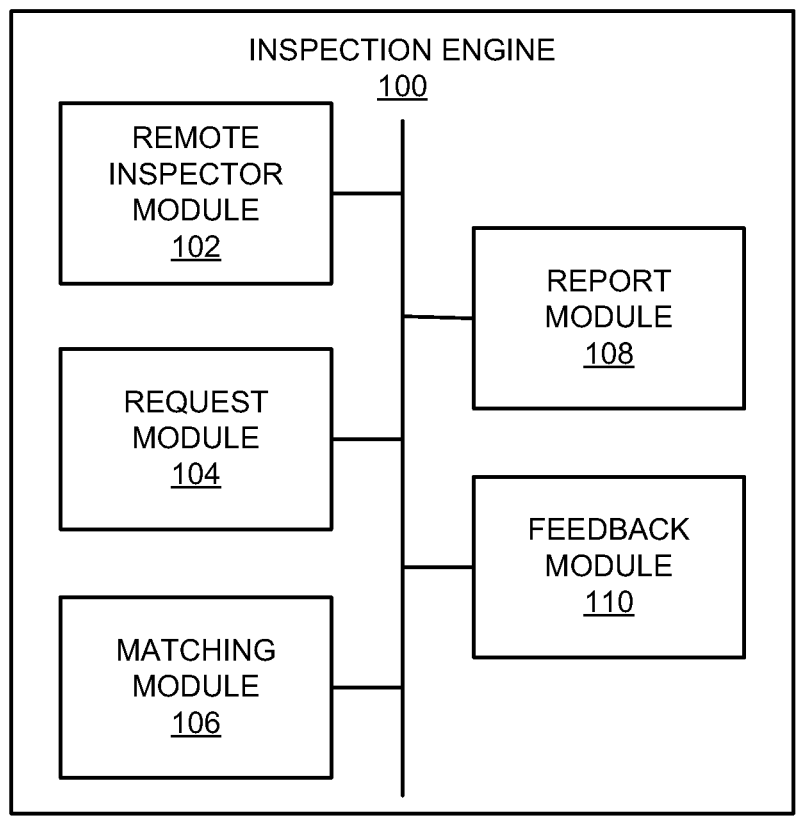
FIG. 1 is a block diagram of an example inspection engine for coordinating remote inspectors.

FIG. 1 is a block diagram of an example inspection engine 100 for coordinating remote inspectors. The example inspection engine 100 may be a part of, or separate from, the online publication system having descriptions of items for sale or auction. The example inspection engine 100 operates to coordinate remote inspectors in conjunction with the online publication system. The example inspection engine 100 comprises a remote inspector module 102, a request module 104, a matching module 106, a report module 108, and a feedback module 110.

The remote inspector module 102 is configured to access data about remote inspectors. The remote inspectors may be buyers or sellers within the online publication system or may be separate from the online publication system. The data about the remote inspectors may include location, distance willing to travel from the location to perform an inspection, predetermined fee, specialty (e.g., autos, jewelry, antiques, etc.), sub-specialty (e.g., European cars, Asian cars, American cars, etc.), and profile information. Profile information may be provided by the remote inspector and may include the remote inspector's education, experience, and the like.

The remote inspector module 102 publishes the accessed information in connection with one or more listings of items for sale. The remote inspector module 102, based on the location of the item of sale, the category of the item for sale, the respective specialty of the remote inspector, and relative ratings of the remote inspectors, provides a listing of available remote inspectors. The buyer may then select a remote inspector to inspect the item for sale.

The request module 104 is configured to receive requests for remote inspectors from buyers. In some instances, the request module 104 publishes a request for a remote inspector from a buyer in the online publication system. The request may be published if no remote inspectors are immediately available to inspect the item for sale. In other instances, where the buyer does not select any of the remote inspectors published by the remote inspector module 102, the request module 104 may publish a request received from the buyer. The request may include an identifier of the listing describing the item for sale, the location of the item for sale, a fee to be paid to the remote inspector by the buyer for the inspection, and a date by which the inspection is to be completed.

Figure 4:
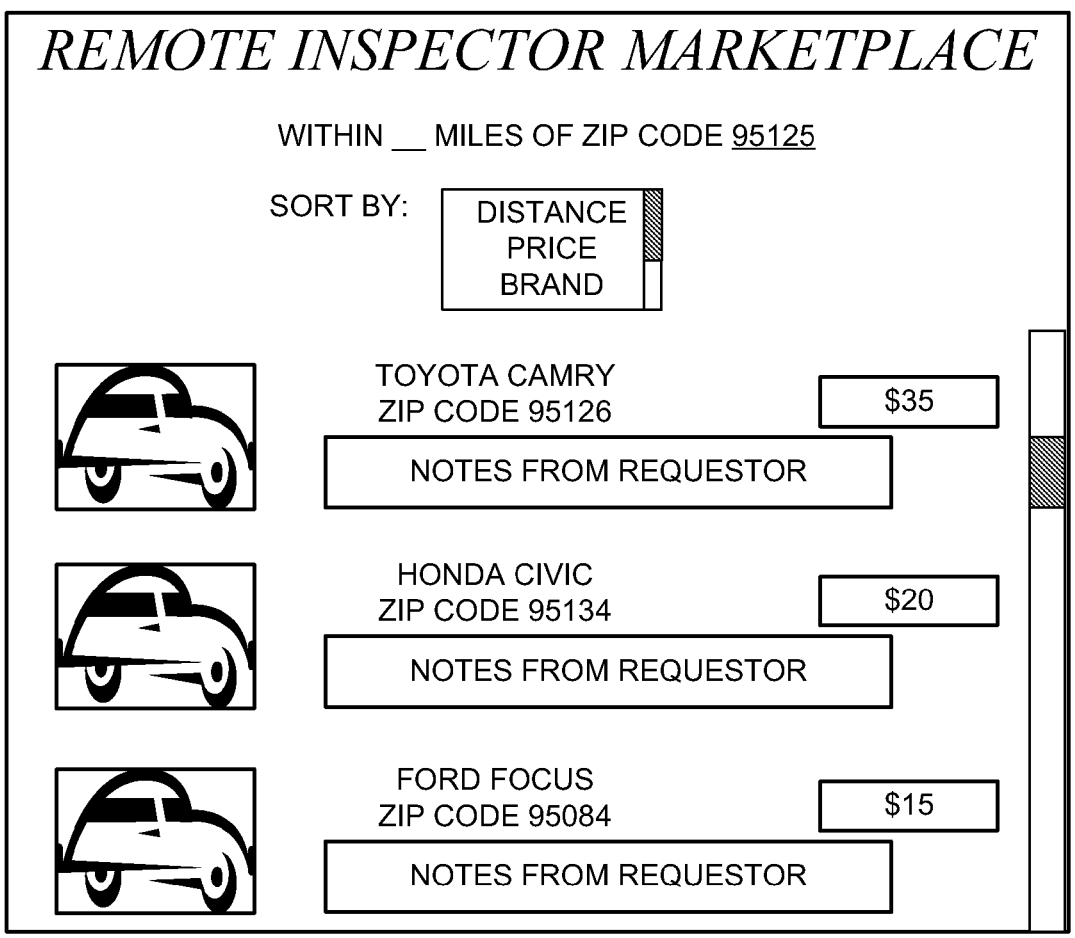
FIG. 4 is an example interface of a remote inspector marketplace.

The requests may be published by the request module 104 in a remote inspector marketplace (depicted in FIG. 4). The request module 104 may allow remote inspectors to query the requests by location, specialty, or other features. In some instances, a remote inspector may be notified by the request module 104 based on pre-determined criteria. For example, a remote inspector may be notified if a request is within 20 miles of his hometown and is related to an automobile.

The matching module 106 is configured to coordinate communications between the buyer, the seller, and a selected remote inspector. The matching module 106 communicates to the remote inspector that the remote inspector was selected, communicates to the buyer that the remote inspector has accepted the request, communicates to the seller that the remote inspector will inspect the item for sale, facilitates the scheduling of the inspection between the seller and the remote inspector, and communicates an inspection report from the remote inspector to the buyer. The matching module 106 further facilitates payment of a fee from the buyer to the remote inspector.

The report module 108 is configured to provide, manage, and communicate an inspection report from the remote inspector to the buyer. The report module 108 may provide a template to the remote inspector for the inspector to complete. The template may be selected from a plurality of templates based on the item for sale. The plurality of templates may include respective templates for automobiles, for jewelry, for collectibles, etc.

The feedback module 110 is to receive feedback about a remote inspector from a buyer who has subsequently purchased an item inspected by the remote inspector. The buyer, prior to purchasing an item, contracts with the remote inspector for an inspection of the item. Upon receiving the purchased item from the seller, the buyer provides separate feedback about the remote inspector based on, for example, timeliness, accuracy, completeness, presentation, whether the remote inspector's fee was appropriate, and other factors. The feedback may include one or more numerical ratings (e.g., using a five-star ranking system). In some instances, the feedback may be provided by the buyer before the item is received or even if the buyer decides not to purchase the item. In other instances, the feedback may be provided in two or more portions where a first portion may be provided before the buyer has received the item (e.g., timeliness and presentation ratings), and a second portion may be received after the buyer has received the item (e.g., accuracy and completeness ratings).

The feedback module 110 further, and in connection with the remote inspector module 102, publishes the feedback to other users of the online publication system. The feedback module 110 may perform a statistical or textual analysis of feedback received from a plurality of buyers to condense or summarize the feedback. The other users may then view the feedback provided by previous buyers before determining whether to contract with the remote inspector.

Figure 2:
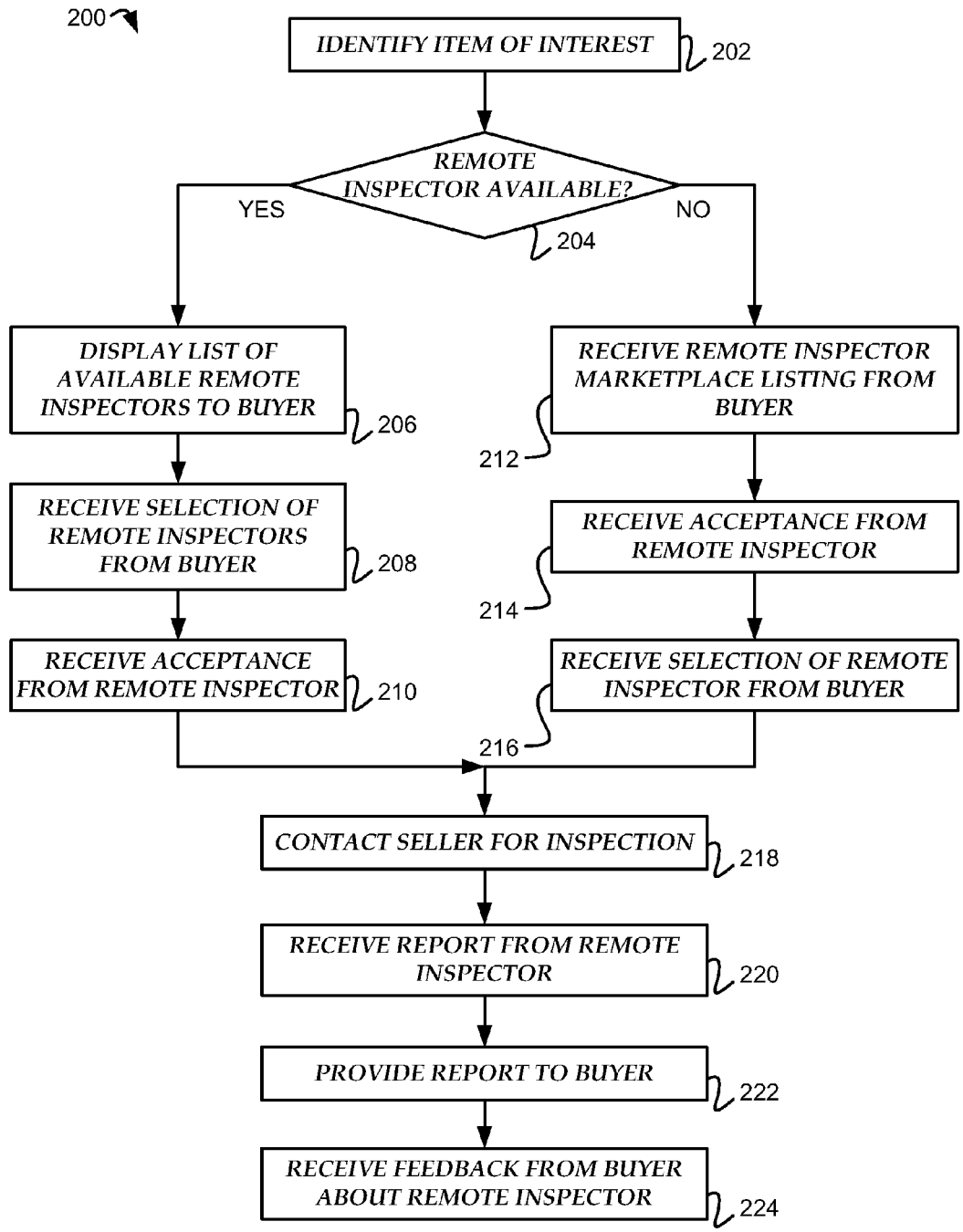
FIG. 2 is a flowchart of an example process for coordinating remote inspectors.

FIG. 2 is a flowchart of an example process 200 for coordinating remote inspectors. The process 200 may be performed by the inspection engine 100.

In an operation 202, an item of interest is identified. The item of interest is usually a description of an item for sale that is to be provided to a buyer in the online publication system. In some instances, the item of interest may be identified as such when it is submitted by the seller. The identification may be based on an indication received from the seller that the seller will allow remote inspectors to inspect the item. In some instances, only items for sale within specific categories may be identified. These categories include automobiles, jewelry, collectibles, and other one-of-a-kind items. The item of interest may be presented to buyers as a listing that includes a complete item description, as a result within a set of search results, or as an item within a menu of items. The item of interest may be identified upon submission by the seller or upon some indication of interest by the buyer (e.g., by clicking on the item of interest to view additional description).

In an operation 204, a determination is made as to whether any remote inspectors are available to inspect the item of interest. As used herein, the availability of a remote inspector is based on the geographic location and/or specialty of the remote inspector.

If one or more remote inspectors are available, the process 200 proceeds to operation 206 to display a list of available remote inspectors to the buyer. The list may include the geographic location of the remote inspector, feedback received from other buyers about the remote inspector, and other information.

The buyer may select a remote inspector based on the information about the remote inspectors. In an operation 208, the selection is received from the buyer. The buyer may choose to select more than one remote inspector to inspect the item for sale. The selection may, in turn, be communicated to the respective remote inspector in an operation 210.

If it was determined in operation 204, however, that no remote inspectors are available in connection with the item of interest, a remote inspector marketplace listing may be received from the buyer in an operation 212. In some instances, a remote inspector marketplace listing is received if the buyer did not select any of the available remote inspectors or if the item for sale was not previously identified as an item of interest (e.g., it does not meet a price threshold or is not associated with a one-of-a-kind item). The remote inspector marketplace listing includes a request from the buyer for one or more remote inspectors to inspect the item for sale. The remote inspector marketplace listing may include the description of the item for sale, the location of the item for sale, the fee that the buyer is willing to pay the remote inspector, and other information.

In an operation 214, an acceptance of the remote inspector marketplace listing is received from one or more remote inspectors. The remote inspectors from whom an acceptance is received may participate in a reverse auction to bid for the inspection.

In an operation 216, a selection of a remote inspector is received from the buyer. The selection may be based on the results of a reverse auction. A buyer may select more than one remote inspector to inspect an item for sale.

In an operation 218, regardless of whether the remote inspector was selected according to operations 206, 208, and 210 or according to operations 212, 214, and 216, the seller is contacted to schedule an inspection of the item for sale. The seller may be contacted by the remote inspector, the inspection engine 100, or by another system.

Presuming the remote inspector and the seller have arranged and conducted the inspection, the inspection report is received from the remote inspector in an operation 220. In an operation 222, this report is provided to the buyer.

Presuming that the item for sale was purchased and delivered to the buyer, feedback is received from the buyer about the remote inspector in a step 224.

Figure 3:
FIG. 3 is an example user interface for selecting an item for sale and for selecting a remote inspector.

FIG. 3 is an example user interface 300 for selecting an item for sale and for selecting a remote inspector. The user interface 300 may be provided to a buyer as part of operation 206 of FIG. 2. The interface 300 comprises a search option 302, results 304, a listing 306, and a remote inspectors list 308. The search option 302 allows a buyer to input a query to identify one or more listings of items for sale that the buyer is interested in purchasing.

The results 304 include a summary of listings of items for sale that match a prior query. The results may be based on geographic location of the item for sale, as shown, or according to another feature such as make, model, title, price, a number of current bids on the item, and the like.

The listing 306 may correspond to a listing summarized with the results 304 or may be a separate listing, such as a sponsored result. The listing 306 conveys information about the item for sale and the seller. Information about the item for sale shown includes make, model, year, condition, mileage, and price. The price includes both a current auction price and a "buy it now" price. The information about the seller includes reviews received from past buyers and username.

The remote inspectors list 308 includes a summary of one or more available remote inspectors for the items for sale listed in the results 304 and/or the listing 306. The remote inspectors list 308 may allow a buyer to select a remote inspector to inspect one or more of the items for sale.

FIG. 4 is an example interface 400 of a remote inspector marketplace. The remote inspector marketplace interface 400 may be provided to remote inspectors who may not be available to inspect the items for sale described in the listings based on a preference or geographic location but who are willing to do so nonetheless.

Using the interface 400, the remote inspector may provide a radius and a geographic location from which the radius is measured. As shown, a zip code is used, but other descriptions of locations, such as an address, may also be used. The remote inspector is given the option to sort requests for remote inspections by distance, price, and brand, as shown. The results may also be sorted by specialty, fee, deadline, and other factors.

The interface 400 shows three results that are requests for remote inspections of automobiles. The remote inspector may accept the remote inspection by, for example, clicking on the request.

Figure 5:
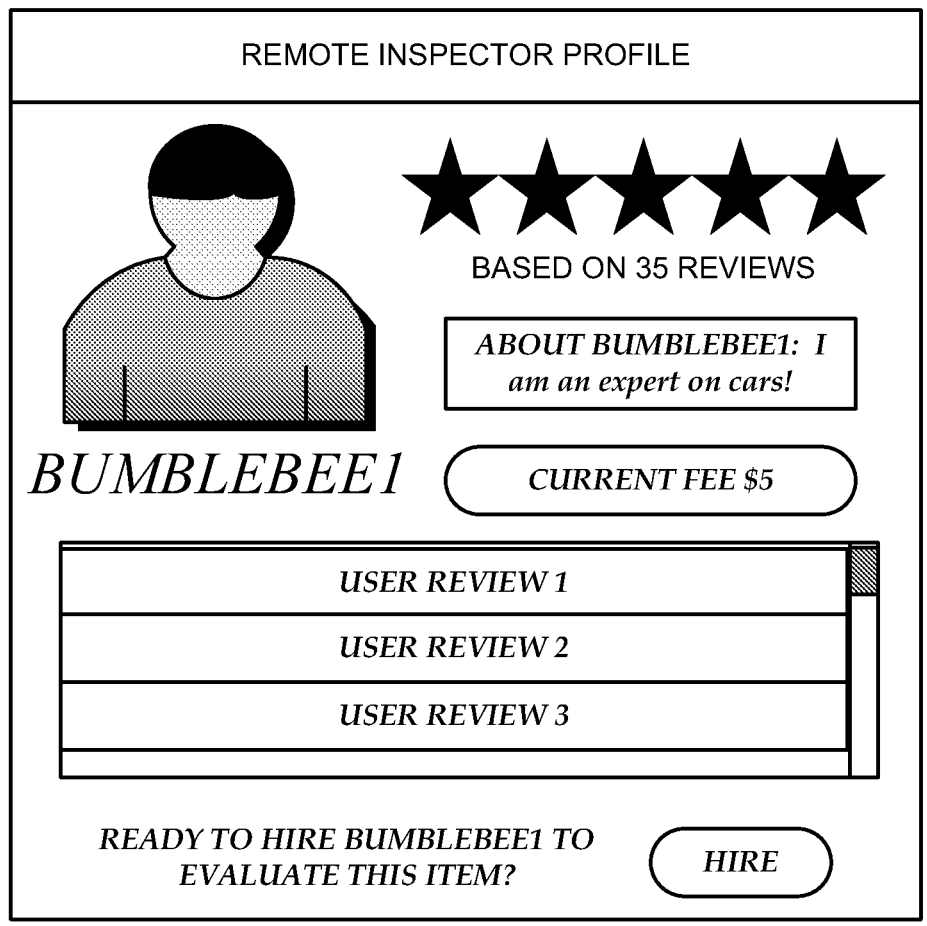
FIG. 5 is an example user interface to display a remote inspector profile.

FIG. 5 is an example user interface to display a remote inspector profile. The profile interface 500 may include information such as the username of the remote inspector, a rating of the remote inspector (e.g., based on a five-star scale, as shown), a short description of the remote inspector received from the remote inspector, fee information, the content of past reviews of the remote inspector, and an option to "hire" or select the remote inspector.

Figure 6:
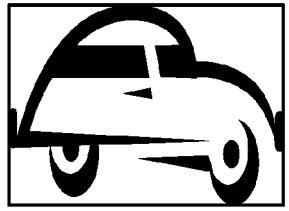
FIG. 6 is an example user interface to display to a remote inspector.
Figure 6:
Figure 6:
Figure 6:
Figure 6:

FIG. 6 is an example user interface to display to a remote inspector. The remote inspector interface 600 may include a status table 602 and an inspection report template 604. The status table 602 lists the inspections that the remote inspector has been selected to perform by the buyers in the online publication system. The status table 602 may include links to other interfaces to perform action items such as contacting a seller to arrange an inspection, filling out an inspection report template, and contacting a buyer for feedback.

Also included in the remote inspector interface 600 is an example inspection report template 604. The inspection report template 604 may be pre-populated with information about the item to be inspected, the seller, and the remote inspector. The inspection report template 604 includes one or more fields where the remote inspector can provide details about the item for sale. The fields may be structured to receive specific information such as a number, a rating (e.g., out of four stars), a selection from a menu, or the like. Other fields may be unstructured and allow the remote inspector to provide text.

FIG. 7 is an example of a user interface to display to a buyer. The buyer interface 700 includes a status table 702 and a completed inspection report 704. The status table 702 lists the inspections that the buyer has initiated with remote inspectors in the online publication system. The status table 702 may include links to other interfaces to perform action items such as contacting a remote feedback to check the status of an inspection report, to leave feedback about a remote inspector, and to view a completed inspection report.

The completed inspection report 704 includes an identifier of the item being inspected and the username of the remote inspector, as shown. The inspection report may include other information such as the date the inspection was performed, the seller's information, and the like. The completed inspection report 704 includes the quantitative and the qualitative information provided by the remote inspector.

Figure 8:
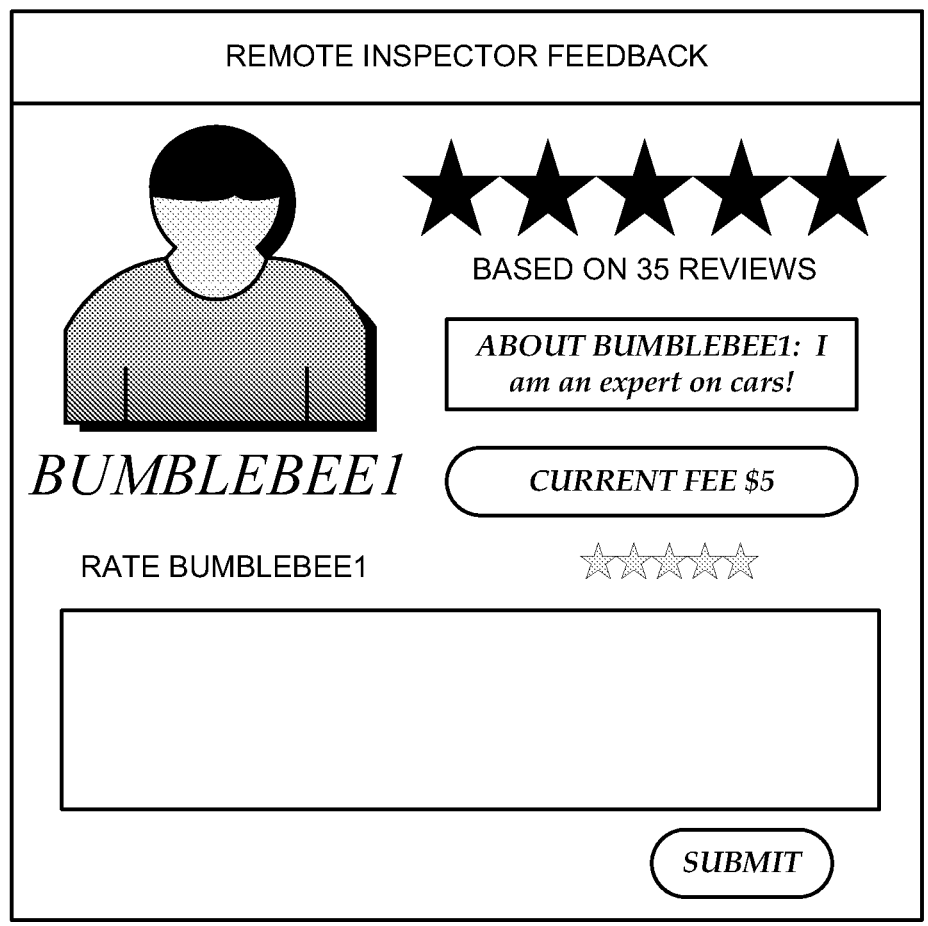
FIG. 8 is an example interface for providing feedback about a remote inspector.

FIG. 8 is an example interface for providing feedback about a remote inspector. The buyer may provide the feedback upon purchasing and receiving the item. As depicted, the feedback interface 800 includes identification of the remote inspector and one or more fields for submitting quantitative or qualitative information about the remote inspector. When the buyer is finished, the buyer submits the feedback to the online publication system.

Figure 9:
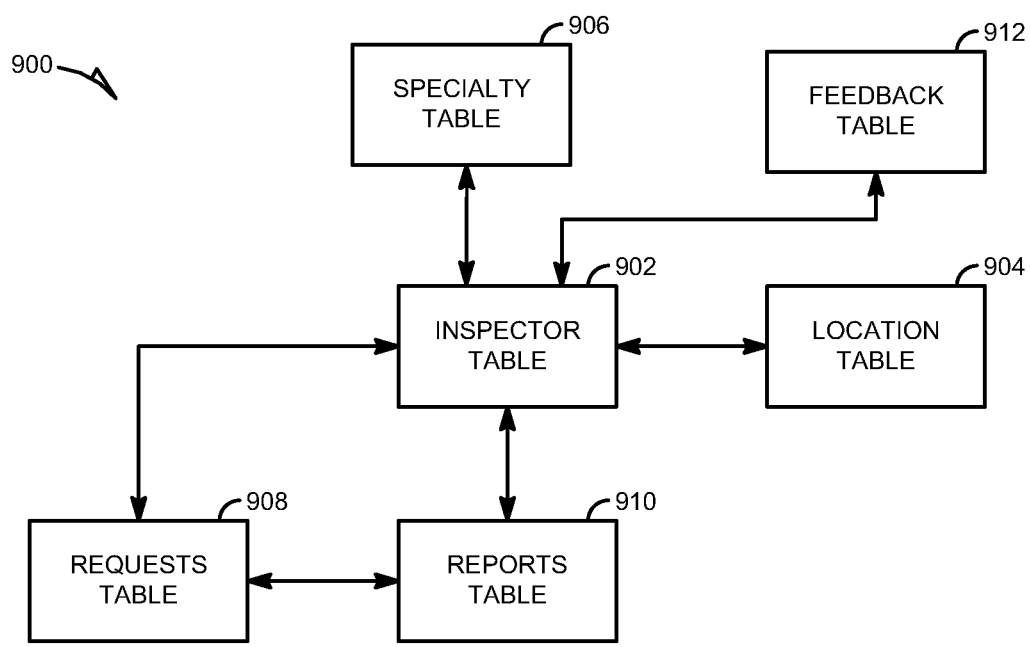
FIG. 9 is a high-level entity-relationship diagram, illustrating various tables that may be maintained within the databases, and that are utilized by and support the example inspection engine.

FIG. 9 is a high-level entity-relationship diagram, illustrating various tables that may be maintained within the databases, and that are utilized by and support the example inspection engine. An inspector table 902 contains a record for each remote inspector of the online publication system, and may include identifier, address, and fee information pertaining to each such remote inspector.

The tables 900 also include a location table 904 and a specialty table 906 in which are maintained location records and specialty records for the remote inspectors, respectively. Each location record within the location table 904 may be linked to one or more remote inspector records, so as to associate a remote inspector with each location record. Likewise, each specialty record within the specialty table 906 may be linked to one or more remote inspector records, so as to associate a remote inspector with each specialty record.

A requests table 908 contains a record for each listing submitted by buyers via the remote inspection marketplace.

The reports table 910 is populated with report records, each report record associated with an inspection to be conducted or having been conducted.

The feedback table 912 contains a feedback record for the executed remote inspections. Each feedback record within the feedback table 912 may be linked to one or more remote inspector records, so as to associate a remote inspector with each feedback record.

Figure 10:
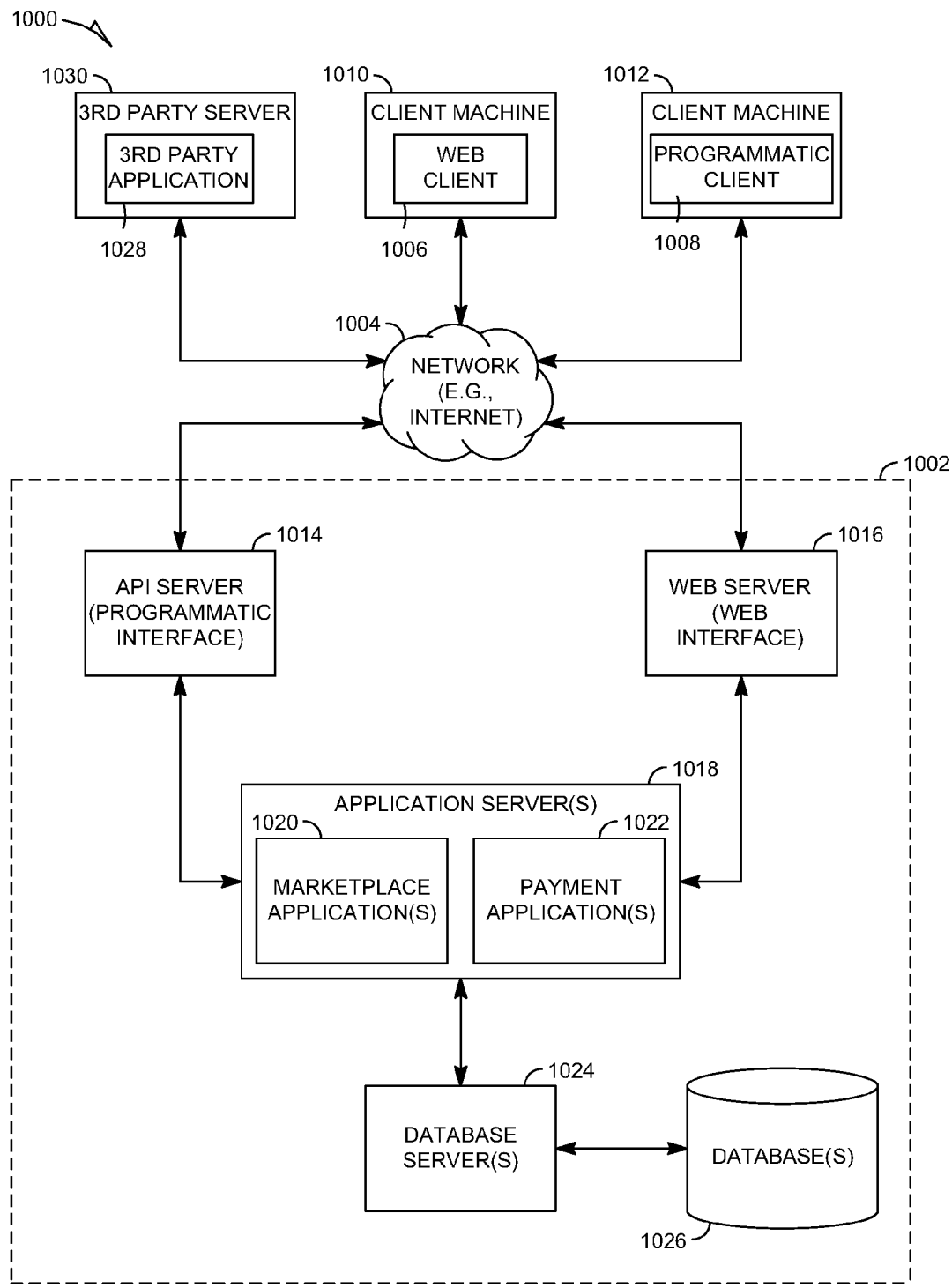
FIG. 10 is a network diagram depicting a client-server system, within which one example embodiment may be deployed.

FIG. 10 is a network diagram depicting a client-server system, within which one example embodiment may be deployed. A networked system 1002, in the example forms of a network-based marketplace or publication system, provides server-side functionality, via a network 1004 (e.g., the Internet or Wide Area Network (WAN)) to one or more clients. FIG. 10 illustrates, for example, a web client 1006 (e.g., a browser, such as the Internet Explorer browser developed by Microsoft Corporation of Redmond, Wash. State), and a programmatic client 1008 executing on respective client machines 1010 and 1012.

An Application Program Interface (API) server 1014 and a web server 1016 are coupled to, and provide programmatic and web interfaces respectively to, one or more application servers 1018. The application servers 1018 host one or more marketplace applications 1020 and payment applications 1022. The application servers 1018 are, in turn, shown to be coupled to one or more database server(s) 1024 that facilitate access to one or more databases 1026.

The marketplace applications 1020 may provide a number of marketplace functions and services to users that access the networked system 1002. The payment applications 1022 may likewise provide a number of payment services and functions to users. The payment applications 1022 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1020. While both the marketplace and payment applications 1020 and 1022 are shown in FIG. 10 to form part of the networked system 1002, it will be appreciated that, in alternative embodiments, the payment applications 1022 may form part of a payment service that is separate and distinct from the networked system 1002.

Further, while the system 1000 shown in FIG. 10 employs a client-server architecture, the present invention is of course not limited to such an architecture, and could equally well find application in a distributed, or peer-to-peer, architecture system, for example. The various marketplace and payment applications 1020 and 1022 could also be implemented as standalone software programs, which do not necessarily have networking capabilities.

The web client 1006 accesses the various marketplace and payment applications 1020 and 1022 via the web interface supported by the web server 1016. Similarly, the programmatic client 1008 accesses the various services and functions provided by the marketplace and payment applications 1020 and 1022 via the programmatic interface provided by the API server 1014. The programmatic client 1008 may, for example, be a seller application (e.g., the TurboLister application developed by eBay Inc., of San Jose, Calif.) to enable sellers to author and manage listings on the networked system 1002 in an off-line manner, and to perform batch-mode communications between the programmatic client 1008 and the networked system 1002.

FIG. 10 also illustrates a third party application 1028, executing on a third party server machine 1030, as having programmatic access to the networked system 1002 via the programmatic interface provided by the API server 1014. For example, the third party application 1028 may, utilizing information retrieved from the networked system 1002, support one or more features or functions on a website hosted by the third party. The third party website may, for example, provide one or more promotional, marketplace or payment functions that are supported by the relevant applications of the networked system 1002.

Figure 11:
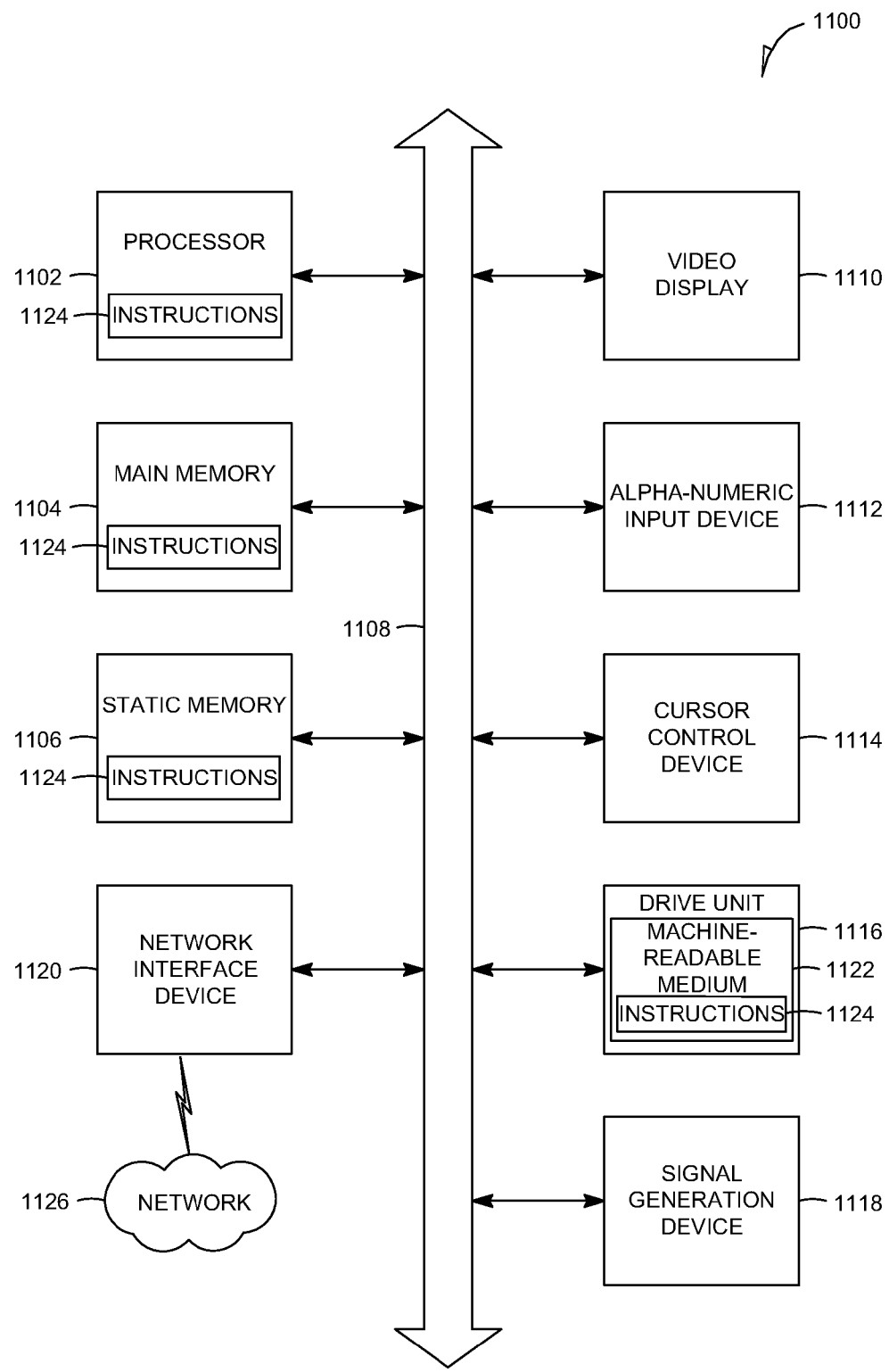
FIG. 11 shows a diagrammatic representation of machine in the example form of a computer system within which a set of instructions for causing the machine to perform any one or more of the methodologies discussed herein may be executed.

FIG. 11 shows a diagrammatic representation of machine in the example form of a computer system 1100 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions 1124 (e.g., software) embodying any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding or carrying a set of instructions for execution by the machine and that causes the machine to perform any one or more of the methodologies of the present invention. The term "machine-readable medium" shall accordingly be taken to include, but not be limited to, solid-state memories, optical and magnetic media, and carrier wave signals.

Thus, a method and system to coordinate remote inspections have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   one or more processors configured to execute modules comprising:
   a remote inspector module to access data about remote inspectors in an online publication system, the data comprising a respective geographical location of individual ones of the respective remote inspectors, and to publish the accessed data in connection with one or more listings of items for sale;
   a request module to receive a request for a remote inspector from a buyer, determine a portion of the remote inspectors based on predetermined criteria, to alert the portion of the remote inspectors about the request based on the pre-determined criteria, and to facilitate a reverse auction among two or more of the remote inspectors;
   a matching module to coordinate communications among a selected remote inspector of the remote inspectors, a buyer, and a seller in the online publication system; and
   a report module to provide a completed inspection report from the selected remote inspector to the buyer.

2. The system of claim 1, wherein the request includes an identifier of a listing of the one or more listings.

3. The system of claim 1, wherein the request module is further to provide a remote inspector marketplace where the request is published to the remote inspectors.

4. The system of claim 1, further comprising a feedback module to receive feedback about a remote inspector from a buyer.

5. The system of claim 1, wherein the remote inspector module is further to identify a portion of the remote inspectors based on a location of an item for sale and the respective geographical location of the portion of the remote inspectors.

6. The system of claim 1, wherein the remote inspector module is further to identify a portion of the remote inspectors based on a category of an item for sale and a respective specialty of the portion of the remote inspectors.

7. The system of claim 1, wherein the report module is further to provide an inspection report template to the selected remote inspector, the inspection report template selected based on a category of an item for sale.

8. The system of claim 1, wherein the matching module is further to facilitate payment of a fee from the buyer to the remote inspector.

9. A method, comprising:
   accessing, using one or more processors, data about remote inspectors in an online publication system, the data comprising a respective geographical location of individual ones of the respective remote inspectors;
   publishing the accessed data in connection with one or more listings of items for sale;
   receiving a request for a remote inspector from a buyer;
   determining, by one or more processors, a portion of the remote inspectors based on predetermined criteria;
   alerting the portion of the remote inspectors about the request based on the pre-determined criteria;
   facilitating, by one or more processors, a reverse auction among two or more of the remote inspectors;
   coordinating communications among a selected remote inspector of the remote inspectors, a buyer, and a seller in the online publication system; and
   providing a completed inspection report from the selected remote inspector to the buyer.

10. The method of claim 9, wherein the request includes an identifier of a listing of the one or more listings.

11. The method of claim 9, further comprising providing a remote inspector marketplace where the request is published to the remote inspectors.

12. The method of claim 9, further comprising receiving feedback about a remote inspector from a buyer.

13. The method of claim 9, further comprising identifying a portion of the remote inspectors based on a location of an item for sale and the respective geographical location of the portion of the remote inspectors.

14. The method of claim 9, further comprising identifying a portion of the remote inspectors based on a category of an item for sale and a respective specialty of the portion of the remote inspectors.

15. The method of claim 9, further comprising providing an inspection report template to the selected remote inspector, the inspection report template selected based on a category of an item for sale.

16. The method of claim 9, further comprising facilitating payment of a fee from the buyer to the remote inspector.

17. A non-transitory computer-readable medium having instructions embodied thereon, the instructions executable by one or more processors to perform operations comprising:
   accessing data about remote inspectors in an online publication system, the data comprising a respective geographical location of individual ones of the respective remote inspectors;
   publishing the accessed data in connection with one or more listings of items for sale;
   receiving a request for a remote inspector from a buyer;
   determining a portion of the remote inspectors based on predetermined criteria;
   alerting the portion of the remote inspectors about the request based on the pre-determined criteria;
   facilitating a reverse auction among two or more of the remote inspectors;
   coordinating communications among a selected remote inspector of the remote inspectors, a buyer, and a seller in the online publication system; and
   providing a completed inspection report from the selected remote inspector to the buyer.

18. The non-transitory computer-readable medium of claim 17, wherein the request includes an identifier of a listing of the one or more listings.

19. The non-transitory computer-readable medium of claim 17, the operations further comprising providing a remote inspector marketplace where the request is published to the remote inspectors.

20. The non-transitory computer-readable medium of claim 17, the operations further comprising receiving feedback about a remote inspector from a buyer.

* * * * *